United States Patent [19]
Horst

[11] Patent Number: 5,670,836
[45] Date of Patent: Sep. 23, 1997

[54] VARIABLE RELUCTANCE START PERMANENT MAGNET MOTOR

[75] Inventor: Gary E. Horst, Manchester, Mo.

[73] Assignee: Emerson Electric Co., St. Louis, Mo.

[21] Appl. No.: 526,770

[22] Filed: Sep. 11, 1995

Related U.S. Application Data

[63] Continuation-in-part of Ser. No. 223,287, Apr. 5, 1994, abandoned.

[51] Int. Cl.$^6$ .................. H02K 15/02; H02K 3/18
[52] U.S. Cl. ............. 310/156; 310/168; 310/254; 310/261
[58] Field of Search ..................... 310/156, 254, 310/261, 181, 168, 269, 185, 179

[56] References Cited

U.S. PATENT DOCUMENTS

| | | | |
|---|---|---|---|
| 3,047,755 | 7/1962 | Angst | 310/254 |
| 3,914,629 | 10/1975 | Gardiner | 310/46 |
| 4,870,358 | 9/1989 | Glaize et al. | 324/208 |
| 4,874,975 | 10/1989 | Hertrich | 310/186 |
| 5,111,096 | 5/1992 | Horst | 310/168 |
| 5,220,228 | 6/1993 | Sibata | 310/254 |
| 5,237,229 | 8/1993 | Ohishi | 310/90.5 |
| 5,260,620 | 11/1993 | Morrill | 310/185 |

Primary Examiner—Steven L. Stephan
Assistant Examiner—Nguyen Tran
Attorney, Agent, or Firm—Polster, Lieder, Woodruff & Lucchesi

[57] ABSTRACT

A single-phase permanent magnet motor (10). A stator assembly (12) includes a stator (14) having a central bore (and a plurality of salient poles (18a–18d) extending into the bore. A rotor (13) is positioned within the bore and is rotatable relative to the stator. Stator windings (17) are used to energize the motor. A magnet (22) installed on the rotor is used to position the rotor in a stable detent or parked position to facilitate starting the motor. The magnet is a ring magnet formed on the rotor and the magnet has a plurality of magnetic ring segments (24a–24d) extending circumferentially about the ring. Each ring segment is shaped to provide a constant level of flux across the ring segment. Each stator has an indentation (36) at one end for aligning the rotor with the stator in its parked position. The result is the availability of more starting torque to start the motor than is available in other motor constructions.

16 Claims, 3 Drawing Sheets

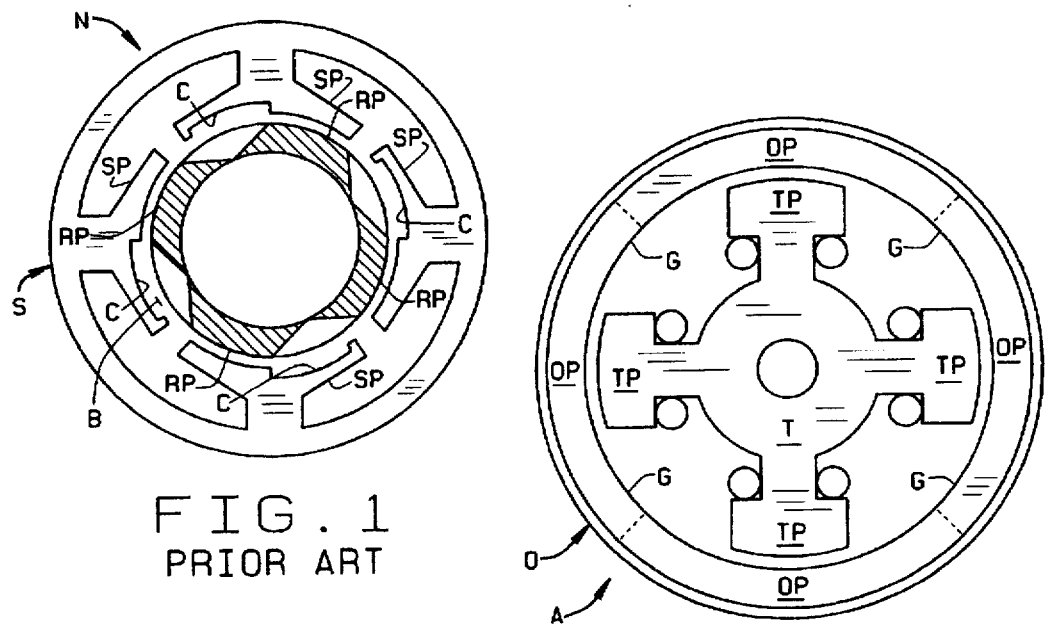
FIG. 1
PRIOR ART
FIG. 2
PRIOR ART
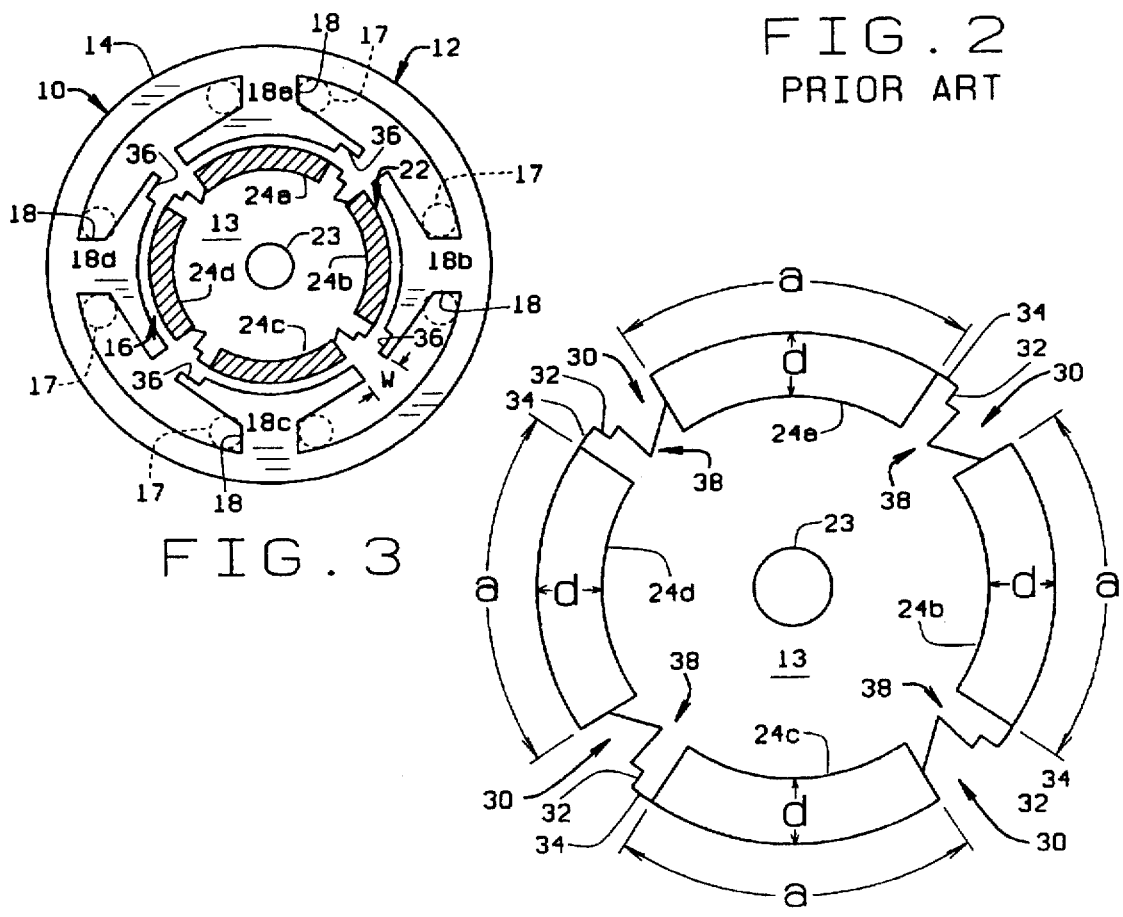
FIG. 3
FIG. 4

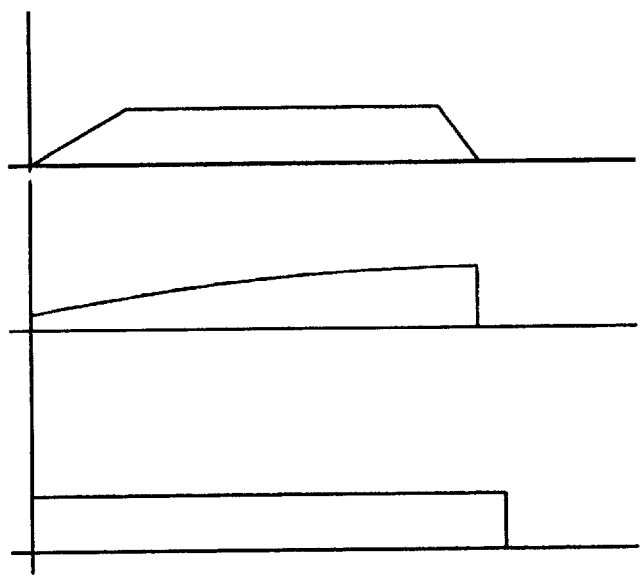
FIG. 7
FIG. 8
PRIOR ART
FIG. 9
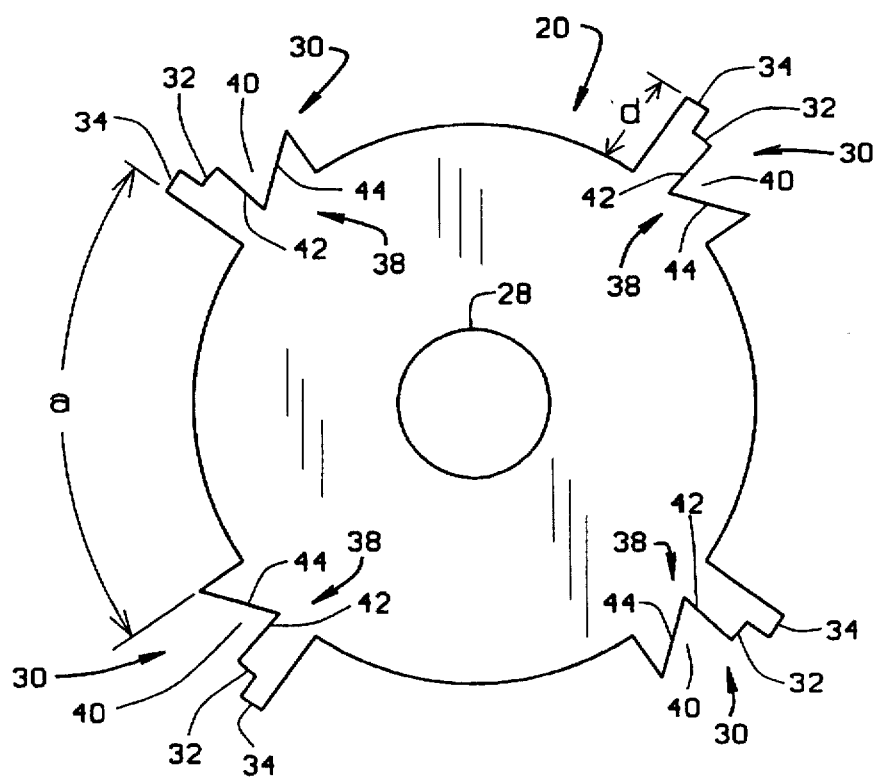
FIG. 10

VARIABLE RELUCTANCE START PERMANENT MAGNET MOTOR

CROSS REFERENCE TO RELATED APPLICATION

This application is a continuation-in-part application of U.S. patent application Ser. No. 08/223,287 filed Apr. 5, 1994 now abandoned.

BACKGROUND OF THE INVENTION

This invention relates to dynamo-electric machines such as permanent magnet (P.M.) motors and, more particularly, to an improvement in such motors which gives them a higher power density than was available in previous motors of this type.

An important element in the design and operation of permanent magnet motors is insuring that the rotor is in a stable detent position for starting. In this regard, one form of a single-phase permanent magnet motor is shown by T. Kenjo and S. Nagamori in their publication P.M. and Brushless D.C. Motors, Sogo Electronics Publishing Company, 1984, at page 94. A drawback with the design of the permanent magnet motor, as shown therein, is that the motor's magnetic flux density is effected by the large air gaps between the motor's stator and rotor assemblies. The size of the air gaps is caused by the large amount of tapering of the rotor poles, or by the stepping the poles so a variable air gap is created. In either situation, the magnetic flux potentially available is not fully utilized.

Alternately, permanent magnets which form part of a rotor assembly for the motor are formed in such a way as to cause the flux produced by the magnets to vary significantly from one area of the rotor to another. This further increases the inefficiency of the motor design so that the torque available to start the machine is significantly less than that potentially available for such purpose. It would therefore be helpful to provide a single-phase permanent magnet motor providing a significant improvement in power density than that currently available. This would strengthen the magnet torque available to fix the rotor in a stable detent position when the motor is off, increasing its ability to return the rotor back to its starting position when the motor is turned off.

SUMMARY OF THE INVENTION

Among the several objects of the present invention may be noted the provision of a dynamo-electric machine having means for positioning a rotor of the machine in a stable detent position to facilitate starting the machine;

the provision of such a dynamo-electric machine which produces a higher power density than prior art machines;

the provision of such a dynamo-electric machine having a ring magnet comprising part of the rotor, the ring magnet including a plurality of ring segments which are shaped to provide a uniform flux across the entire portion of a circumference of the machine rotor where the segment is positioned;

the provision of such a rotor in which the ring segments are fully magnetized across each rotor pole;

the provision of such a rotor to have a recess formed in the rotor adjacent each end of each segment;

the provision of such a dynamo-electric machine having a stator with the same number of stator poles as there are ring segments;

the provision of such a stator whose pole faces subtend an arc greater than that subtended by the ring magnets and include a recess in each stator pole face to facilitate parking the rotor in a preferred, stable detent position;

the provision of such a stator in which span of stepped airgaps is a stator pole are minimized to produce higher levels of power density;

the provision of such a rotor in which the width of the recesses formed thereon correspond in width to the gap between adjacent stator poles;

the provision of such a dynamo-electric machine which is a single-phase permanent magnet motor; and, the provision of such a motor in which the magnetic material used in the motor's rotor is more efficiently utilized than that in other motors to efficiently start the motor by because the ring magnets are so utilized as to provide a higher level of starting torque than previously.

In accordance with the invention, generally stated, a singlephase permanent magnet motor comprises a stator assembly including a stator having a central bore and a plurality of salient poles extending into the bore. A rotor is positioned within the bore and is rotatable relative to the stator. A magnet installed on the rotor is used to position the rotor in a stable detent position to facilitate starting the motor. The magnet is a ring magnet formed on the rotor and the magnet has a plurality of magnetic ring segments extending circumferentially about the ring, each ring segment provides a constant level of flux across the ring segment. Other objects and features will be in part apparent and in part pointed out hereinafter.

BRIEF DESCRIPTION OF THE DRAWINGS

FIG. 1 is a sectional view of a prior art permanent magnet motor illustrating the magnetization pattern thereof;

FIG. 2 is a sectional view of another prior art permanent magnet motor;

FIG. 3 is a sectional view of permanent magnet motor of the present invention;

FIG. 4 is an elevational view of a rotor for the motor;

FIG. 8 is a similar graph representing the flux density across a prior art ring magnet segment for the machine of FIG. 2;

FIG. 9 is a similar for a ring magnet segment of the present invention; and,

FIG. 10 is a plan view of a rotor lamination for the machine.

Corresponding reference characters indicate corresponding parts throughout the drawings.

DESCRIPTION OF A PREFERRED EMBODIMENT

Figure 5:
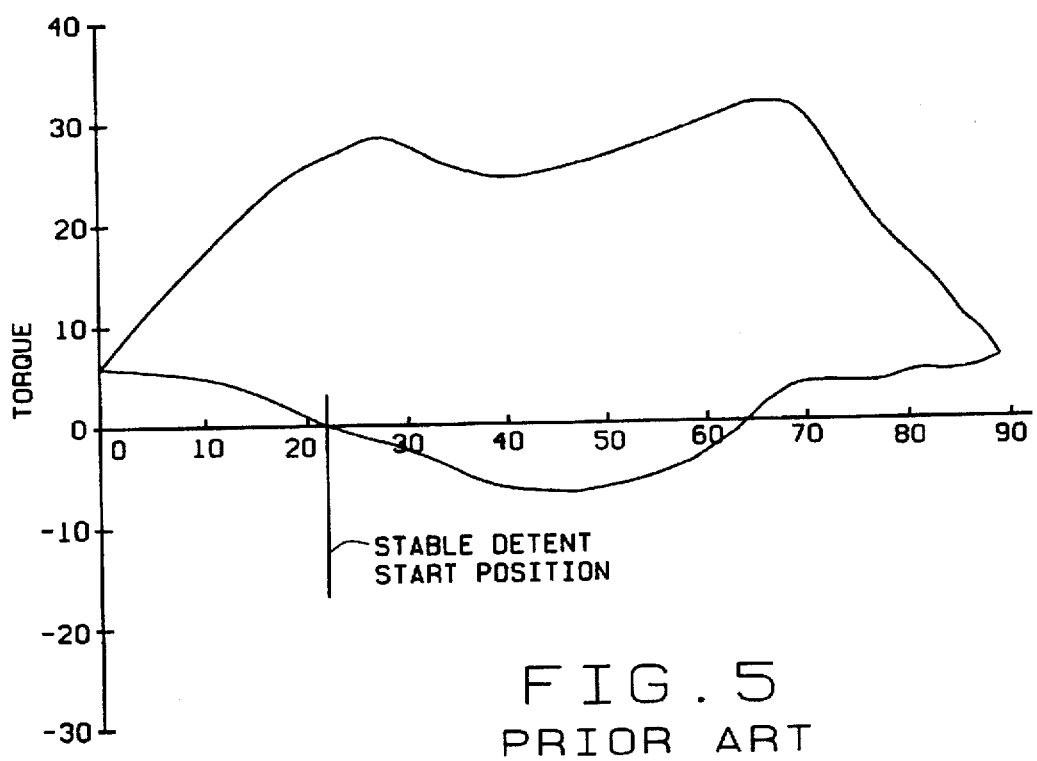
FIG. 5 is a graph illustrating magnet torque as a function of the rotor starting position from a stable detent position for the prior art motor of FIG. 1.

Referring to the drawings, a dynamo-electric machine such as a single-phase permanent magnet motor is shown in FIGS. 1 and 2. FIGS. 1 and 2 are prior art motors with the motor of FIG. 1 having a stator S with a central bore B and a plurality of stator poles SP. The motor further includes a rotor R disposed for rotation in bore B. Rotor R has a plurality of rotor poles RP defined by permanent magnets M incorpoated into the rotor. The magnetized sections of the rotor are indicated by the shaded portions of the rotor. Typically, these sections of the rotor have tapering ends so that the flux across the face of each pole is as shown in FIG. 7. Further, the face of each stator pole has a cutout or step C formed therein. Each cutout extends substantially, but not fully across the face of its associated stator pole. This is done to facilitate establishing a stable detentposition to which the rotor is drawn when power is removed from the motor. This makes starting the motor easier when the motor is restarted.

A second prior art dynamo-electric machine A is shown in FIG. 2. The machine of FIG. 2 is an inverted type machine wherein the rotor rotates about the outside of the stator. In FIG. 2, a stator T has four outwardly salient poles TP. An annular, or ring shaped rotor 0 rotates about the stator. Rotor o has magnet segments G which define rotor poles oP. The boundary between the respective segments is indicated by the dashed lines. While the inner diameter of the rotor is uniform about its circumference, the outer face of the respective stator poles is tapered so that the air gap between the rotor and stastor gradually decreases across the face of each stator pole. The resulting flux pattern for this dynamo-electric machine construction is shown in FIG. 8. Tapering the stator poles has the same effect as using the cut-outs in the prior art machine of FIG. 1. That is, the tapering is used to establish a detent position for the rotor to ease restarting. Although the prior art motors of FIGS. 1 and 2 are shown as four pole motors, it will be understood that they could have other pole constructions.

A drawback with dynamo-electric machines such as machines M and Avis that because of the respective rotor and stator constructions, full use of the magnetic material available to produce flux is not made. Thus, machines of these types are not as efficient as they could otherwise be.

Referring to FIG. 3, a dynamo-electric machine of the present invention is indicated generally 10. The machine includes a stator assembly 12 and a rotor 13. The stator assembly includes a stator 14 having a central bore 16, and associated stator windings 17 for energizing the machine. Further, the stator has a plurality of salient poles 18 extending into bore 16. Four such stator poles 18a–18d are shown in FIG. 3; although, the stator could have more than four poles. Rotor 13 is positioned within bore 16 and is rotatable relative to stator 12. The rotor is comprised of a stack of individual rotor laminations 20, one of which is shown in FIG. 10.

Dynamo-electric machine 10, which is, for example, a BPM motor next includes magnet means indicated generally 22 and installed on rotor 14 for positioning the rotor in a stable detent position when power to the machine is removed. As with the prior art machines described above, this facilitates subsequent starting of the machine. Means 22 includes a ring magnet formed as part of the rotor and installed on a rotor shaft 23. There are a plurality of magnetic ring segments 24a–24d spaced circumferentially about the ring, the number of ring segments corresponding to the number of stator poles. This is as shown in FIGS. 3 and 4. The ring segments each comprise one pole of a pair of poles. Thus, ring segments 24a, 24c represent magnetic north poles, and segments 24b, 24d magnetic south poles. Each ring segment subtends an equal are a about the circumference of the ring magnet. And, each ring segment has a uniform thickness or depth d throughout its length.

This is significant because it means each ring segment provides a constant level of flux across the ring segment. The flux level across a ring magnet segment is as shown in FIG. 9. In contrast to the flux profiles of FIGS. 7 and 8 for the prior art dynamo-electric machines, the magnet segments 24 provide a more uniform flux level and accordingly more efficient utilization of the available flux.

Referring to FIGS. 3, 4, and 10, rotor 13 is comprised of the plurality of stacked rotor laminations 20. The laminations are formed as is well-known in the art. Each lamination has a central opening 28 for mounting the lamination on rotor shaft 23. As shown in FIGS. 3 and 4, a recess indicated generally 30 is formed in the rotor between adjacent ring segments. Each recess first includes a stepped shoulder 32. The width of this shoulder is such that the arcuate distance between one end of a ring segment to the other, the width of a tab 34 whose height corresponds to thickness of the segment for the outer end of the segment to be flush with the outer end of the tab, and the width of the shoulder corresponds to the arcuate distance subtended by a stator pole.

Accordingly, each stator pole subtends an are greater than the arc subtended by the ring segments. Further, an indentation or notch 36 is formed at one end of each stator pole. As seen in FIG. 3, the respective notches are opposite from the tab and shoulder adjacent a ring segment, and the width of the notch corresponds to the combined width of the tab and shoulder. The function of the notch is to facilitate positioning the rotor at the stable detent position shown in FIG. 3. That is, one end of the ring segments substantially align with the inner ends of the respective indentations in the stator poles when the machine is stopped.

There is a width w between one end of one stator pole and the adjacent end of the adjoining rotor pole. Each recess 30 has a section 38 adjacent stepped shoulder 32 whose width corresponds to the width w between respective ends of the stator poles. Section 38 comprises a generally V-shaped notch 40 where one side of the notch is formed by a vertical wall 42 extending from shoulder 32. The other side of the notch is formed by an angled wall 44 whose outer end intersects a ring segment at a point approximately halfway up one side of the ring segment. At its apex, the depth of the notch corresponds to the thickness or depth of the ring segments. As a result of this construction, each recess 30, as noted, comprises a first indentation whose width corresponds to that of the indentation in a stator pole and a second and deeper indentation the depth of which corresponds to the thickness of the ring segments. And, the width of the second indentation corresponds to the width of the space between the stator poles, and the width of the ring segment and the first indentation in the recess substantially corresponds to the width of the are subtended by a stator pole. Again, this facilitates positioning the rotor in a stable detent position for starting.

Referring again to FIG. 10, the rotor lamination 20 is shown absent the magnetic ring segments. The other portions of the rotor; i.e., the tabs 34, shoulders 32, and notches 40 are all formed as part of the lamination. The ring magnet segments are one piece elements which are attached to the rotor after a stack of rotor laminations is formed.

Figure 6:
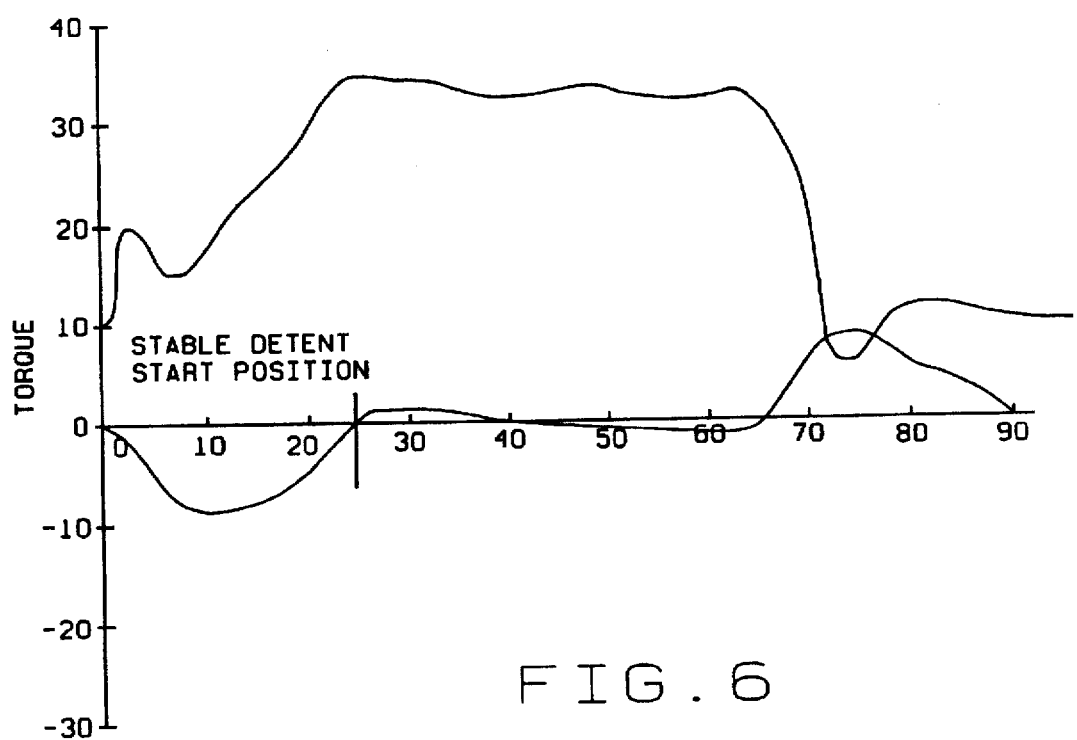
FIG. 6 is a graph illustrating magnet torque as a function of the rotor starting position from a stable detent position for the motor of FIG. 3; and, FIG. 7 is a graph representing the flux density across a prior art ring magnet segment for the dynamo-electric machine of FIG. 1.

The advantage of the invention is shown in a comparison of the torque curves of FIGS. 5 and 6. In each graph, the torque available to start the machine is plotted as a function of intial rotor position measured from a stable detent position. As can be seen therein, more starting torque is available using the rotor/stator construction of the invention as compared with that available in prior constructions. Since significantly more starting torque can be produced by having the ring magnet segments produce uniform flux across the entire width of the segment, and because the rotor/stator construction causes the rotor to be parked in the stable detent position shown in FIG. 3, starting the motor is more easily accomplished.

What has been described is a dynamo-electric machine such as single-phase permanent magnet motor having means for positioning a rotor of the machine in a stable detent position. This is done to make starting the machine easier. One advantage of the motor is that it produces a higher power density than prior art motors of a similar type. The motor includes a ring magnet comprising part of the rotor, the ring magnet being formed by a plurality of ring segments. These are shaped to provide a uniform flux across the entire portion of the circumference of the machine rotor where the segment is located. Further, the ring segments are fully magnetized across each rotor pole. The rotor has a recess formed therein adjacent each end of each segment. A stator of the motor has the same number of stator poles as there are ring segments, and the stator pole faces subtend an arc greater than that subtend by the ring magnets. Each pole face has a recess to facilitate parking the rotor in a preferred, stable detent position. Also, the span of stepped airgaps in a stator pole is minimized to increase power density. The width of the recesses formed in the rotor correspond in width to the gap between adjacent stator poles. By more efficiently using the magnetic material in the rotor, the motor is more efficiently started because the ring magnets are so utilized that they provide a higher level of starting torque than previous motor constructions.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

What is claimed is:

1. In a dynamoelectric machine having a stator assembly including a stator having a central bore and a number of salient stator poles extending into the bore and associated stator windings, and a rotor positioned within said bore and rotatable relative to the stator, the improvement comprising magnet means for positioning the rotor in a stable detent position to facilitate starting the machine, the magnet means including a ring magnet formed on the rotor and including a number of defined magnetic ring segments extending circumferentially about the rotor, each ring segment providing a constant level of magnetization across the segment, the rotor having a stepped recess formed therein between adjacent ring segments, each recess having a depth corresponding to a thickness of the adjacent ring segments, and each stator pole having an indentation formed therein to one side thereof, the rotor aligning with the stator so a recess in the rotor substantially aligns with the indentation in a stator pole when the machine is stopped, the indentation in each stator pole being formed at one end of the stator pole, and each stepped recess in the rotor comprising a first recess portion having a width corresponding to that of the indentation in a stator pole and a second recess portion the depth of which corresponds to the thickness of the ring segments.

2. The improvement of claim 1 wherein each ring segment subtends an equal arc about a circumference of the ring magnet, and each ring segment has a uniform thickness throughout its length.

3. The improvement of claim 2 wherein the number of ring segments corresponds to the number of stator poles.

4. The improvement of claim 3 wherein there is a space between each stator pole, each second recess portion in a rotor having a width corresponding to the width of the space.

5. The improvement of claim 3 wherein each second recess portion has a width corresponding to a width of a space between stator poles, and a width of a ring segment and a first recess portion substantially corresponds to a width of the arc subtended by a stator pole.

6. A single-phase permanent magnet motor comprising:
a stator assembly including a stator having a central bore and a number of salient stator poles extending into the bore and associated stator windings;
a rotor positioned within said bore and rotatable relative to the stator; and,
magnet means installed on the rotor for positioning the rotor in a stable detent position to facilitate starting the motor and including a ring magnet formed on the rotor.

7. The motor of claim 6 wherein each ring segment subtends an equal arc about the circumference of the ring magnet, and each ring segment has a uniform thickness throughout its length.

8. The motor of claim 7 wherein the number of ring segments corresponds to the number of stator poles.

9. The motor of claim 8 wherein a space is formed between each stator pole, each second recess portion in the rotor having a width corresponding to a width of the space, and having a number of magnetic ring segments extending circumferentially about the rotor, each ring segment providing a constant level of magnetization across the ring segment, the rotor having a stepped recess formed therein between adjacent ring segments, each recess having a depth corresponding to a thickness of the ring segments, each stator pole subtending an arc greater than the arc subtended by the ring segments and each stator pole having an indentation formed therein to one side thereof, the rotor aligning with the stator so one of the recesses in the rotor substantially aligns with an indentation in a stator pole when the motor is stopped, the indentation in each stator pole being formed at one end of the stator pole, and each stepped recess in the rotor comprising a first recess portion having a width corresponding to that of the indentation in a stator pole and a second recess portion having a depth which corresponds to the thickness of the ring segments.

10. The motor of claim 9 wherein each second recess portion has a width corresponding to a width of a space between stator poles, and the width of a ring segment and a first recess portion substantially corresponds to a width of the arc subtended by a stator pole.

11. A single-phase permanent magnet motor comprising:
a stator having a plurality of stator poles and associated stator windings;
a rotor movable relative to the stator; and,
means assisting starting of the motor using a variable reluctance torque, said means including a plurality of recessed sections formed in said rotor and spaced about the periphery thereof, said recessed sections minimizing magnetic material in those portions of the rotor where the recessed sections are formed for a sufficient variable reluctance torque to be available for motor start-up, while having a minimal effect on the operation of the motor when the motor is running, each recessed section being a stepped recess having a first recessed portion having a width corresponding to the width of an indentation in a stator pole, and a second recessed portion having a width corresponding to the width of the space between adjacent stator poles.

12. The motor of claim 11 wherein said recessed sections are equidistantly spaced about the periphery of said rotor, the number of said recessed sections corresponding to the number of stator poles.

13. The motor of claim 12 further including a plurality of magnetic ring segments extending circumferentially about the rotor with each ring segment providing a constant level of magnetization across the arcuate length thereof, and each ring segment being installed on said rotor between adjacent recessed sections formed therein.

14. The motor of claim 13 wherein each ring segment is of uniform thickness across the arcuate length thereof, and each recessed section has a maximum depth corresponding to the thickness of the ring segments.

15. The motor of claim 14 further including means for aligning the motor in a stable detent position.

16. The motor of claim 15 wherein said aligning means includes alignment means formed on each stator pole and aligning with said recessed sections formed in said rotor, said stable detent position being attained when said alignment means are aligned with said recessed sections.

* * * * *

UNITED STATES PATENT AND TRADEMARK OFFICE
CERTIFICATE OF CORRECTION

PATENT NO. : 5,670,836
DATED : September 23, 1997
INVENTOR(S) : Gary E. Horst

It is certified that error appears in the above-identified patent and that said Letters Patent is hereby corrected as shown below:

Col. 3, line 65
 replace "are"
 with --arc--.

Col. 4, line 21
 replace "are"
 with --arc--.

Col. 6, line 10
 replace "are"
 with --arc--.

Col. 6, line 19
 replace "."
 with --and having a number of magnetic ring segments extending circumferentially about the rotor, each ring segment providing a constant level of magnetization across the ring segment, the rotor having a stepped recess formed therein between adjacent ring segments, each recess having a depth corresponding to a thickness of the ring segments, each stator pole subtending an arc greater than the arc subtended by the ring segments and each stator pole having an indentation formed therein to one side thereof, the rotor aligning with the stator so one of the recesses in the rotor substantially aligns with an indentation in a stator pole when the motor is stopped, the indentation in each stator pole being formed at one end of the stator pole, and each stepped recess in the rotor comprising a first recess portion having a width corresponding to that of the indentation in a stator pole and a second recess portion having a depth which corresponds to the thickness of the ring segments. --

UNITED STATES PATENT AND TRADEMARK OFFICE
CERTIFICATE OF CORRECTION

PATENT NO. : 5,670,836
DATED : September 23, 1997
INVENTOR(S) : Gary E. Horst

It is certified that error appears in the above-identified patent and that said Letters Patent is hereby corrected as shown below:

Col. 6, line 29
delete "and having a number of magnetic ring segments extending circumferentially about the rotor, each ring segment providing a constant level of magnetization across the ring segment, the rotor having a stepped recess formed therein between adjacent ring segments, each recess having a depth corresponding to a thickness of the ring segments, each stator pole subtending an arc greater than the are subtended by the ring segments and each stator pole having an indentation formed therein to one side thereof, the rotor aligning with the stator so one of the recesses in the rotor substantially aligns with an indentation in a stator pole when the motor is stopped, the indentation in each stator pole being formed at one end of the stator pole, and each stepped recess in the rotor comprising a first recess portion having a width corresponding to that of the indentation in a stator pole and a second recess portion having a depth which corresponds to the thickness of the ring segments."

Col. 6, line 36
replace "are"
with -- arc --.

Signed and Sealed this

Twenty-second Day of December, 1998

Attest:

BRUCE LEHMAN

Attesting Officer

Commissioner of Patents and Trademarks